United States Patent [19]

Berger et al.

[11] 4,089,980
[45] May 16, 1978

[54] PROCESS FOR NPN RUMINANT FEED SUPPLEMENT

[75] Inventors: Kenneth L. Berger, Palo Alto; Jorge J. Nassar, Sunnyvale; William B. Benken, Mission Viejo, all of Calif.

[73] Assignee: Syntex (U.S.A.) Inc., Palo Alto, Calif.

[21] Appl. No.: 772,037

[22] Filed: Feb. 25, 1977

[51] Int. Cl.² .................................................. A23K 1/22
[52] U.S. Cl. ..................................... 426/69; 426/635; 426/636; 426/658; 426/807
[58] Field of Search .................... 426/2, 69, 623, 626, 426/627, 630, 636, 807, 635, 658

[56] References Cited

U.S. PATENT DOCUMENTS

| | | | |
|---|---|---|---|
| 3,677,767 | 7/1972 | McNeff | 426/62 X |
| 3,873,728 | 3/1975 | Moore | 426/2 |
| 3,873,733 | 3/1975 | Moore | 426/302 X |
| 4,006,253 | 2/1977 | Berger et al. | 426/69 |

Primary Examiner—Raymond N. Jones
Assistant Examiner—R. A. Yoncoskie
Attorney, Agent, or Firm—Alan M. Krubiner

[57] ABSTRACT

An NPN ruminant feed supplement having a high percentage of chemically bound urea is prepared from cellulose commodities by an efficient process involving reaction with urea and a dilute mineral acid at low pH.

12 Claims, No Drawings

PROCESS FOR NPN RUMINANT FEED SUPPLEMENT

BACKGROUND OF THE INVENTION

It is well known that ruminant animals (for example, cattle and sheep) have the unique ability to convert non-protein nitrogen (NPN) to animal protein. This is accomplished, to a large extent, by the action of the microbial flora in the rumen of the animal which degrades such non-protein nitrogen sources to ammonia, which is then converted to protein.

The most widely used non-protein nitrogen source in ruminant feeds has been urea. However there are major problems with the use of urea in ruminant feeds since enzymatic breakdown of urea to ammonia often occurs substantially faster than the microbial uptake of the liberated ammonia. The excess ammonia thus produced can reach toxic levels in the animal which may lead to severe disability or death and such excess ammonia is not utilized for protein synthesis resulting in an inefficient utilization of available nitrogen. Additionally, ruminant animals will noticeably discriminate against urea in feed.

As a result, much work has been done to control the rate at which urea is broken down in the rumen by physically mixing urea with various starch or other polysaccharide sources or molasses, or by combining it chemically with various monosaccharides, polyshaccharides or polysaccharide degradation products to afford slow release urea formulations. See, for example the chapter entitled Nonprotein Nitrogen Supplements for Ruminants in M. Gutcho, "Feeds for Livestock, Poultry and Pets", Noyes Data Corp., (1973), U.S. Pat. Nos. 2,748,001, 3,677,767, 3,873,733 and 3,873,728 and Belgian Pat. No. 806,971.

In the latter two U.S. patents is described the acid catalyzed reaction of urea with partially degraded polysaccharides in the presence of acid (preferably about pH 5-6) to afford an NPN ruminant feed supplement. However, none of the prior art methods describes the preparation of an NPN ruminant feed supplement that can be economically produced on a large scale, competitive with current free urea feed formulations or natural protein feeds such as soybean meal; that contain a relatively high percentage of chemically bound, slowly releasable urea, relative to free urea; and that provide readily available carbohydrates from inexpensive sources.

BRIEF DESCRIPTION OF THE INVENTION

The present invention relates to a novel process for the preparation of NPN ruminant feed supplements. More particularly, the present invention relates to the preparation of ruminant feed supplements containing a high percentage of chemically bound urea, relative to free urea, which are prepared in a simple, commercially feasible, process from readily available cellulose commodities.

DETAILED DESCRIPTION OF THE INVENTION

The present invention relates to a novel process for the preparation of NPN ruminant feed supplements. More particularly the NPN ruminant feed supplements prepared by the process of the present invention contain a high percentage of urea which is chemically bound to a carbohydrate molecule. More particularly, the process of the present invention relates to the use of readily available cellulose commodities as starting materials and their conversion, by reaction with urea in the presence of a dilute mineral acid at low pH, to afford a product substantially comprising urea chemically linked to cellulose degradation products.

As described above, the prior art discloses physical mixtures of urea with polysaccharides, and chemically bound urea prepared by reaction with partially degraded polysaccharides in the presence of acid. However, in contradistinction, the process of the present invention involves such reaction at a low pH (less than 1) to afford products having a low content of undesired ammonia.

Additionally, the process of the present invention causes a high percentage of urea to be bound to the cellulose degradation products (e.g. monosaccharides, oligosaccharides, furfural, and the like). Thus, based upon the monosaccharide potential from hydrolysis of the cellulose commodity, more than 40% of the theoretical amount of urea becomes chemically bound (assuming a 1:1 molar ratio of urea:monosaccharide), thus being available in a slow-release form, and reducing the amount of free urea in the product to acceptable levels.

The process of the present invention may be more particularly described by reference to the following manipulative steps:

A mixture of a dilute mineral acid, urea and the cellulose commodity, having a pH less than 1, is prepared.

This mixture is then heated at an elevated temperature to cause the hydrolysis of the cellulose (and other polysaccharides) and the chemical binding of urea to the reaction products thereof formed by the hydrolysis.

Finally, after the desired amount of urea is chemically bound, the pH of the mixture is adjusted to between about 3 and 7 to afford the final product.

As starting cellulose commodities that may be used in the process of the present invention there may be mentioned a variety of readily available, inexpensive industrial and agricultural waste products such as, for example, soy hulls, rice hulls, peanut hulls, oat hulls, cottonseed hulls, wheat straw, oat straw, corn stalks, soybean hay, corn cobs, cottonseed trash, bagasse, molasses and fiber residue from starch, cane and beet sources, cow and horse manure, wood by-products such as chips, pine shavings, dust and paper, sewage, and the like. Preferred commodities are soy hulls, rice hulls, peanut hulls and oat straw. The mineral acids that may be employed include for example sulfuric acid, phosphoric acid, hydrochloric acid and mixtures thereof. As mentioned above a dilute mineral acid in sufficient quantity to provide the reaction mixture with a pH less than 1 must be used for purposes of the present process. For this purpose there may be mentioned, for example, sulfuric acid (2N to 8N), phosphoric acid (2N to 8N), and hydrochloric acid (2N to 6N). The choice of acid will be dictated to a certain extent by the desired content of, for example, sulfur, phosphorus or chloride in the final product. The use of hydrochloric acid is preferred, especially hydrochloric acid between about 3.5 and 5.5N, most preferably between about 4.0 and 5.0N.

A critical and unanticipated feature of the present process is that the reaction is conducted at a low pH, preferably below pH 1. Prior art procedures for saccharide-urea reactions involve the use of mineral acids, but at substantially higher pH than that of the present process. For example, U.S. Pat. No. 3,873,733 describes the use of an acid at about pH 5-6. U.S. Pat. No. 3,677,767 describes the use of an acid at a pH between about 1.5 and 3.0, and it is stated therein that at pH values below 1.5 the breakdown or hydrolysis of urea is accelerated and such conditions are not advisable.

Surprisingly, it has been found in the present invention that the use of dilute mineral acid at low pH (less than 1), affords superior results for the hydrolysis of the cellulose and the binding of the resulting sugars to the urea. It has been found that up to a relatively high acid concentration (e.g. 6N HCl) above which the product begins to char, the greater the acid concentration the lesser the production of unwanted ammonia.

In the present process, the cellulose commodity is mixed with urea and the dilute mineral acid. The order of addition is not narrowly critical although normally it is preferred to first combine the urea and the acid and then to add the cellulose commodity, preferably portionwise. During admixture the temperature is maintained between about 20° and 40° C. An equimolar amount of urea, relative to the monosaccharide potential from hydrolysis of the cellulose commodity, will normally be employed in the present process, although an excess of urea may be utilized. The total quantity of urea employed will, of course, be reflected in the free urea content of the final product. In general the weight ratio of urea to 100% acid is in the range of from about 0.5 to about 3.0 and the weight ratio of cellulose commodity to 100% acid is in the range of from about 2.0 to about 9.0 Surprisingly, it has been found that ratios of urea:100% acid between about 0.6 and 1.2 are particularly preferred inasmuch as free ammonia levels are substantially reduced under these conditions.

In the next step, the resulting mixture is heated at an elevated temperature to hydrolyze the cellulose and other polysaccharides and cause the chemical reaction of the resulting sugars with urea. For this portion of the reaction a temperature of between about 50° and 120° C., preferably between about 80° and 110° C., is utilized. The heating is continued for a sufficient period of time to bind the desired degree of urea, which will preferably be greater than 40% of theoretical based upon potential monosaccharide, assuming a 1:1 ratio of monosaccharide:urea. At the preferred temperature range of 80°–110° C. the desired degree of bind will normally be achieved within about 2 and 20 hours. Additional heating beyond this point may result in undesired charring or carbonization of the product.

After the above step has been completed, the mixture is cooled and the pH is adjusted to between about 3 and 7, most preferably between about 3.5 and 4.5. This may be accomplished by the addition of a suitable base to neutralize the mineral acid present. For example, bases such as calcium hydroxide, sodium hydroxide, potassium hydroxide, and the like may be employed. The use of sodium and potassium bases results in the formation of soluble salts whereas the use of, e.g., a calcium base, results in the formation (in the case of calcium sulfate and calcium phosphate) of an insoluble salt, which may then be separated from the product, if desired, by standard means such as centrifugation, filtration, and the like. The type of salt formed will thus dictate, to a certain extent, the salt content of the final product.

Alternatively, volatile acids such as hydrogen chloride, may be removed in large part from the reaction mixture by e.g., evaporation or distillation to bring the pH of the resulting product within the desired range. This procedure minimizes the formation of salts and will be preferable in those cases where an especially low salt content, (e.g., less than 10% w/w) measured by total ash, for the ruminant feed supplement is desired.

The crude product resulting from the pH adjustment step may be utilized as is, or by appropriate concentration or dilution in the form of an aqueous solution; or it may be dried by conventional methods to afford a solid material.

Either the solids or liquid supplement can be utilized separately, or preferably in admixture with other conventional ruminant feed components, for administration to the animal.

The products prepared by the process of the present invention have a binding of urea to theoretically available monosaccharide (assuming a 1:1 ratio) of at least 40% (as determined by resistance to urease), the remainder of the urea remaining as unbound; and in general have a protein equivalency on a dry basis from about 35% to about 65%. The products prepared by the present process are palatable as determined by taste acceptance studies in sheep on a weight maintenance regimen, and have not been observed to cause toxic reactions which are characteristic of free urea-containing supplements.

The present process may be performed on a large scale, suitable for commercial application, utilizing a single reaction vessel with a minimum of manipulative steps, and is conveniently performed as a batch process.

The following examples further describe the process of the present invention. These examples are given by way of illustration only and are not intended to restrict or limit the scope of the invention, as set forth hereinabove, in any manner.

EXAMPLE 1

Urea was added to 3N HCl until dissolved. Then the cellulose commodity was added portionwise at room temperature, mixed and heated at 90° C for 10 hours and cooled. Dilute aqueous sodium hydroxide was added to a pH of 4.0 to afford the product.

| Formulation 1: | |
|---|---|
| Peanut hulls | 20 g. |
| Urea | 6 g. |
| 3N HCl | 50 ml. |
| Formulation 2: | |
| Soy hulls | 20 g. |
| Urea | 6 g. |
| 3N HCl | 50 ml. |
| Formulation 3: | |
| Oat straw | 20 g. |
| Urea | 6 g. |
| 3N HCl | 50 ml. |
| Formulation 4: | |
| Pine shavings | 10 g. |
| Urea | 3 g. |
| 3N HCl | 50 ml. |

The product gave the following analysis (standardized to 25.0% protein equivalent on a wet basis).

| Analysis (wt. %) | Form. 1 | Form. 2 | Form. 3 | Form. 4 |
|---|---|---|---|---|
| Total ash | 13.5 | 12.8 | 15.1 | 30.6 |
| Solids | 44.4 | 40.9 | 46.7 | 69.4 |
| Nitrogen | 4.0 | 4.0 | 4.0 | 4.0 |
| Sodium | 4.6 | 4.9 | 6.3 | 11.6 |
| Ammonia | 0.25 | 0.28 | 0.25 | 0.27 |
| Free urea | 3.9 | 4.1 | 3.8 | 4.9 |
| Bound urea (relative to total urea used) | 54.3 | 52.5 | 55.6 | 41.8 |

EXAMPLE 2

This example illustrates a large scale preparation.

To 42.11 Kg. of 3N HCl was added 6.02 Kg. urea (feed grade) and the mixture stirred until the urea was dissolved. While stirring 20.05 Kg. of rice hulls (20 mesh) was slowly added in small portions, keeping the temperature below 40° C. The temperature was then raised to 90° C and held for 10 hours. The mixture was then cooled to below 40° C and a solution of 3.38 Kg. sodium hydroxide in 5.80 Kg. water was then added to bring the pH to between 3.8 and 4.0.

Analysis of the wet material was as follows:
Nitrogen = 3.86% = 24.3% protein equivalent
Free urea = 3.5%
Ammonia = 0.7%
Percent urea bound (of total) = 42%
Total ash = 10.1%
Solids = 38%
Sodium chloride = 6.1%.

EXAMPLE 3

The following example illustrates the effect of the urea:acid ratio on ammonia production. The reactions were performed as in Example 1, using rice hulls as cellulose source, and ammonia was measured as $NH_4^+$ in the product.

| Rice hulls (g) | Urea (g) :acid (g) (normality acid) | Urea (g) 100% acid (g) | Free $NH_4^+$ (mg/g product) |
|---|---|---|---|
| 20 | 6.0 – 2.32 (1.5N) | 2.6 | 12.3 |
| 20 | 6.0 – 4.64 (3.0N) | 1.3 | 13.4 |
| 20 | 6.0 – 6.97 (4.5N) | 0.8 | 6.5 |
| 20 | 6.0 – 9.28 (6.0N) | 0.6 | 5.2 |
| 25 | 7.5 – 2.32 (0.5N) | 3.2 | 16.5 |
| 25 | 7.5 – 4.64 (3.0N) | 1.6 | 10.6 |
| 25 | 7.5 – 6.97 (4.5N) | 1.1 | 6.1 |
| 25 | 7.5 – 9.28 (6.0N) | 0.8 | 6.9 |
| 25 | 12.5 – 4.64 (3.0N) | 2.7 | 26.5 |

Additionally, a similar experiment utilizing 3N and 6N $H_2SO_4$ in place of HCl gave ammonia (free $NH_4^+$) levels of 7.44 and 3.43 mg/g, respectively.

Clearly, the higher concentration acids result in a lower production of ammonia.

EXAMPLE 4

The procedure of Example 1 utilizing 20 g. of rice hulls, 6 g. urea and 50 ml. of HCl (3.0, 4.5 or 6.0N) was repeated and the percentage urea bound (of total) and ammonia production (free $NH_4^+$) was measured with time.

| Conc. Acid (N) | Time (hr.) | % Urea bound | $NH_4^+$ (mg/g) |
|---|---|---|---|
| 3.0 | 5 | 52 | 4.0 |
| 3.0 | 10 | 48 | 5.0 |
| 3.0 | 15 | — | 6.4 |
| 3.0 | 20 | 40 | 13.4 |
| 4.5 | 5 | 41 | 3.5 |
| 4.5 | 10 | 54 | 3.7 |
| 4.5 | 15 | 56 | 5.0 |
| 4.5 | 20 | 54 | 6.5 |
| 6.0 | 5 | 30 | 3.0 |
| 6.0 | 10 | 35 | 3.2 |
| 6.0 | 15 | 55 | 4.0 |
| 6.0 | 20 | 50 | 5.2 |

The above results demonstrate that at low acid concentrations urea bind decreases and ammonia production significantly increases with time. Conversely, at higher acid concentrations, e.g. 4.5 and 6.0N, a high urea bind and relatively low ammonia level can be achieved even over a prolonged time.

EXAMPLE 5

The procedure of Example 1 was repeated utilizing 10 g. soy hulls, 3 g. urea and 50 ml. 6N HCl. The effect of temperature and time on % urea bound is shown below.

| Temp. (° C.) | Time (hr.) | % Urea Bound (of total) |
|---|---|---|
| 50 | 19 | 9.6 |
| 67 | 3.5 | 12.4 |
| 67 | 22 | 21.4 |
| 95 | 2.5 | 27.3 |
| *95 | 19 | 35.4 |
| **95 | 21 | 39.0 |

*very little carbonization, % free ammonia = 0.13
**noticeable carbonization

EXAMPLE 6

The procedure of Example 5 was repeated except that urea was not added. After heating at 95° C for 19 hours significant charring occurred. This illustrates that at higher acid concentration, (e.g. 6N HCl) a 2-step procedure whereby cellulose is first treated with acid, and the reaction product then reacted with urea, is not practical.

EXAMPLE 7

The procedure of Example 5 was repeated utilizing 50 ml 8N HCl in place of the 6N HCl, and a temperature of 95° C.

Urea bound after 19 hours = 41.0%
Urea bound after 21 hours = 42.7%

There was significant carbonization observed at both times indicating that 8N HCl is too concentrated for the present process.

What is claimed is:

1. A process for the preparation of an NPN ruminant feed supplement, which process comprises:
   (a) mixing a cellulose-containing commodity, urea and a dilute mineral acid to afford a mixture having a pH less than 1,
   (b) heating the above mixture at an elevated temperature for a period of time sufficient to cause the chemical binding of urea to a level of at least 40% of theoretical of the monosaccharide potential of said cellulose-containing commodity based on a 1:1 molar ratio of binding of urea to monosaccharide, and
   (c) adjusting the pH of the mixture obtained in step (b) to between about 3 and 7.

2. The process of claim 1 wherein said cellulose commodity is selected from the group consisting of soy hulls, rice hulls, peanut hulls and oat straw.

3. The process of claim 1 wherein said mineral acid is selected from the group consisting of hydrochloric acid, 2N to 6N, sulfuric acid, 2N to 8N and phosphoric acid, 2N to 8N, and mixtures thereof.

4. The process of claim 3 wherein hydrochloric acid of from 3.5 to 5.5N is employed.

5. The process of claim 1 wherein, in step (b), the elevated temperature is between about 50° and 120° C.

6. The process of claim 5 wherein said temperature is between about 80° and 110° C.

7. The process of claim 1 wherein the weight ratio of urea to 100% acid is between about 0.5 and 3.0.

8. The process of claim 7 wherein the weight ratio of urea to 100% acid is between about 0.6 and 1.2.

9. The process of claim 1 wherein the weight ratio of cellulose-containing commodity to 100% acid is between about 2.0 and 9.0.

10. The process of claim 1 wherein, in step (c), said pH adjustment is effected by the removal of a volatile acid.

11. The process of claim 1 wherein in step (b), said time is between about 2 and 20 hours.

12. The process of claim 1 wherein said feed supplement is additionally dried to afford a solid product.

* * * * *